United States Patent [19]

Toya

[11] Patent Number: 4,748,565
[45] Date of Patent: May 31, 1988

[54] APPARATUS FOR DETECTING SPEED OF VEHICLE WITH INTERNAL COMBUSTION ENGINE

[75] Inventor: Takaaki Toya, Higashimatsuyama, Japan

[73] Assignee: Diesel Kiki Co., Ltd., Japan

[21] Appl. No.: 758,048

[22] Filed: Jul. 23, 1985

[30] Foreign Application Priority Data

Jul. 24, 1984 [JP] Japan .................................. 59-151993

[51] Int. Cl.⁴ ........................................... F02M 51/00
[52] U.S. Cl. ............................... 364/431.05; 324/161; 364/565; 73/2
[58] Field of Search ................ 364/431.07, 426, 424.1, 364/565, 424; 73/2, 506, 509, 510, 518; 324/160, 161, 163, 166

[56] References Cited

U.S. PATENT DOCUMENTS

| | | | |
|---|---|---|---|
| 4,070,901 | 1/1978 | McDonald | 73/2 |
| 4,086,532 | 4/1978 | Aronson et al. | 324/161 |
| 4,167,699 | 9/1979 | Baker | 364/565 |
| 4,506,216 | 3/1985 | Fukamachi et al. | 324/161 |
| 4,527,248 | 7/1985 | Takase et al. | 364/565 |
| 4,566,069 | 1/1986 | Hirayama et al. | 364/565 |

FOREIGN PATENT DOCUMENTS 0121781 9/1979 Japan ..................................... 73/518

Primary Examiner—Parshotam S. Lall
Attorney, Agent, or Firm—Guy W. Shoup

[57] ABSTRACT

In a speed detecting apparatus of a vehicle with an internal combustion engine whose rotational output is derived through a transmission, the apparatus comprises a circuit for calculating the gear ratio set in the transmission on the basis of the engine speed and a signal roughly indicative of the vehicle speed and a calculating circuit responsive to the result of the calculation in the circuit and the engine speed at each instant for calculating the speed of the vehicle at each instant. Thus, it is possible to accurately detect the vehicle speed at each instant in a short detection period.

8 Claims, 3 Drawing Sheets

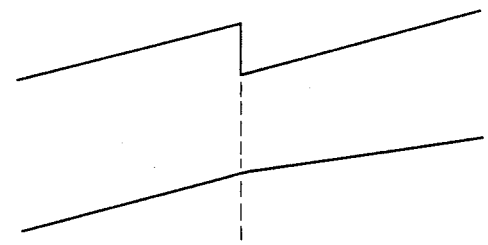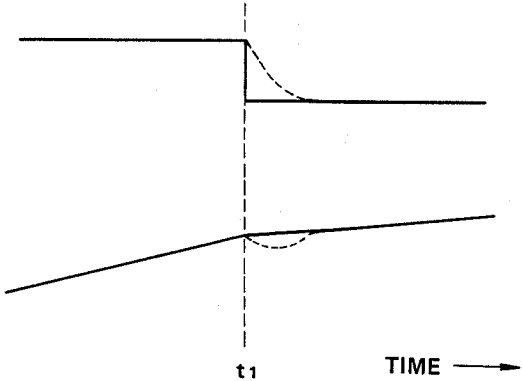

APPARATUS FOR DETECTING SPEED OF VEHICLE WITH INTERNAL COMBUSTION ENGINE

BACKGROUND OF THE INVENTION

The present invention relates to a speed measuring apparatus capable of detecting the speed of a vehicle powered by an internal combustion engine with high accuracy.

For detecting the speed of a vehicle with an internal combustion engine, there has been widely used a speed detecting apparatus employing a multi-poled magnet operatively coupled through a speedometer capable with the output shaft of a rotational power transmitting device and a reed switch which is opened/closed in accordance with the rotation of the magnet. However, in the conventional speed detecting apparatus, the distances between the magnetic poles of the magnet are not uniform. Consequently, when the engine or other device associated with the vehicle is controlled in a digital manner on the basis of the pulse signal produced by the opening/closing operation of the reed switch, because of the non-uniformity of the intervals between the magnetic poles, hunting is apt to occur in the vehicle speed control operation and deviation from a desired target value is also apt to arise. As a result, the vehicle speed control accuracy is lowered.

To overcome these disadvantages, it is necessary to use a magnet in which the magnetic poles are uniformly arranged. However, magnets with equidistant poles are expensive so that their use will increase the cost of the speed detecting device. In this connection, if the vehicle speed is computed on the basis of the period for one rotation of the magnet, the computed vehicle speed will be unaffected by the non-uniform spacing of the magnetic poles. However, in this case since the period over which the vehicle speed is detected becomes long, it is impossible to quickly carry out the desired control operation in a digital manner and, as a result, the control accuracy is lowered.

Accordingly to one known approach, there is proposed a speed detecting device for eliminating these drawbacks. In the proposed device the gear ratio set in the transmission is mechanically detected and the vehicle speed is calculated on the basis of the detected gear ratio and the engine speed at each instant. However, since the gear ratio selected in the transmission is mechanically detected by the use of a mechanical device in the proposed speed detecting device, mechanical switches for sensing the position of the shift lever must be provided in the transmission. Consequently, the proposed device is disadvantageous because of its mechanical complexity and high cost.

SUMMARY OF THE INVENTION

It is an object of the present invention to provide an improved apparatus for detecting the speed of a vehicle powered by an internal combustion engine.

It is another object of the present invention to provide a vehicle speed detecting apparatus which is capable of detecting the speed of a vehicle with an internal combustion engine with high accuracy without need for a complex mechanism.

It is still another object of the present invention to provide a vehicle speed detecting apparatus which is capable of accurately detecting the speed of a vehicle with an internal combustion engine within a short detection period.

It is a further object of the present invention to provide a vehicle speed detecting apparatus which is applicable to any type of vehicle with an internal combustion engine without any adjustment.

According to the present invention, in an apparatus for detecting the speed of a vehicle with an internal combustion engine whose rotational output is supplied through a transmission to a wheel driving mechanism, the apparatus comprises a first means for producing a first signal relating to the speed of the internal combustion engine, a second means for producing a second signal related to the speed of the vehicle, a third means responsive to the first and second signals for calculating a gear ratio set in the transmission, and a fourth means responsive to the result of the calculation in the third means and the first signal for calculating the vehicle speed at each instant and producing output data indicating the calculated vehicle speed.

With this construction, at first, the gear ratio set in the transmission is calculated on the basis of a signal roughly indicative of the vehicle speed calculated from the rotation of, for example, a speedometer cable and the signal showing the engine speed, and the vehicle speed is calculated with high accuracy on the basis of the calculated gear ratio and the engine speed. Since the second signal used for the calculation of the gear ratio is detected from the rotation at the output side of the transmission, the detection period is longer than that for the first signal. However, since the frequency of change in the gear ratio of the transmission is low, high accuracy detection of vehicle speed can be attained regardless of the relatively long period required for detecting the second signal.

The calculation for obtaining the vehicle speed is carried out in the fourth means in response to the first signal and the calculated result indicative of the gear ratio obtained by the third means. In this case, the first signal always shows the engine speed at each instant with higher accuracy than is possible using the signal obtained from the rotational period of the speedometer cable. As a result, it is possible to accurately detect the vehicle speed at each instant in a short detection period.

As described above, the second signal, which is obtained on the basis of the rotation of, for example, a speedometer cable and gives an indication of the vehicle speed, is used for calculating the gear ratio, for which a highly accurate calculation is not required, and the vehicle speed can be accurately detected in a short period on the basis of the first signal and the gear ratio obtained from the second signal.

The invention will be better understood and the other objects and advantages thereof will be more apparent from the following detailed description of a preferred embodiment with reference to the accompanying drawings.

BRIEF DESCRIPTION OF THE DRAWINGS

FIGS. 2A to 2E are characteristic curves for explaining the operation of the apparatus shown in FIG. 1.

DESCRIPTION OF THE PREFERRED EMBODIMENTS

Figure 1:
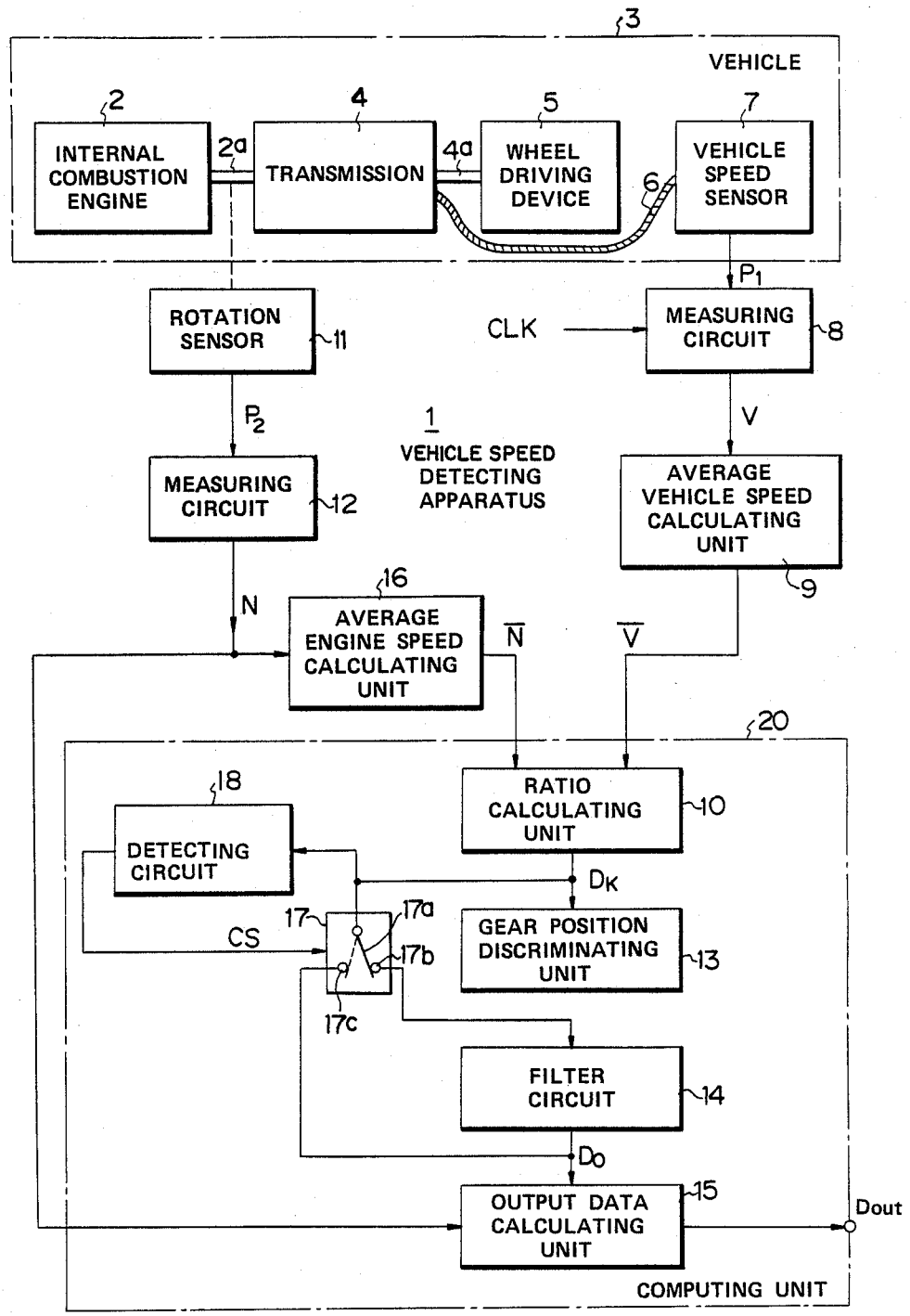
FIG. 1 is a block diagram showing an embodiment of a vehicle speed detecting apparatus according to the present invention.

FIG. 1 is a block diagram showing an embodiment of a vehicle speed detecting apparatus according to the present invention. More specifically, the figure shows a vehicle speed detecting apparatus 1 for accurate, short-period detection of the speed of a vehicle 3 driven by an internal combustion engine 2. In the vehicle 3, the rotational output from an output shaft 2a of the internal combustion engine 2 is input to a transmission 4 and the rotational output derived from the output shaft 4a of the transmission 4 is transmitted to a wheel driving device 5. One end of a speedometer cable 6 is operatively coupled with the output shaft 4a and the other end thereof is coupled with a vehicle speed sensor 7 which produces pulses $P_1$ at intervals the length of which depends upon the rotational speed of the speedometer cable 6. For example, a conventional vehicle speed sensor comprising a multi-poled magnet coupled with the speedometer cable and a reed switch which is located close to the magnet so as to open/close in accordance with the rotation of the magnet, may be employed as the vehicle speed sensor 7.

The pulses $P_1$ are applied as a count control signal to a measuring circuit 8 for counting clock pulses CLK, which have a period smaller than the period of the pulses $P_1$ by an order of magnitude sufficient to enable their use for measuring the period of the pulses $P_1$. The measuring circuit 8, which may be a digital counter, produces a counted value corresponding to the period of the pulses $P_1$, that is, corresponding to the vehicle speed, as vehicle speed data V each time a pulse $P_1$ is generated. The vehicle speed data V is applied to an average vehicle speed calculating unit 9.

In this embodiment, the average vehicle speed calculating unit 9 calculates the average vehicle speed once for every eight vehicle speed data obtained from the measuring circuit 8, and the obtained average vehicle speed data $\overline{V}$ is applied to a ratio calculating unit 10 in a computing unit 20.

On the other hand, a conventional rotation sensor 11 coupled with the output shaft 2a of the internal combustion engine 2 produces a pulse $P_2$ every time the output shaft 2a rotates by a predetermined angle. Another measuring circuit 12 is responsive to the pulse train signal constituted by the pulses $P_2$ and calculates the speed of the internal combustion engine 2 on the basis of the period of the pulse train signal. The result of the calculation is output as engine speed data N indicating the engine speed.

The engine speed data N obtained for every pulse $P_2$ is applied to an average engine speed calculating unit 16 which calculates the average speed of the internal combustion engine 2 on the basis of the speed data N and produces average engine speed data $\overline{N}$ indicating the average speed of the internal combustion engine 2.

The average engine speed data $\overline{N}$ is input to the ratio calculating unit 10, wherein the gear ratio k set in the transmission 4 at that time is calculated in accordance with the following formula:

$$k = a_1 \cdot \frac{\overline{N}}{\overline{V}} \quad (1)$$

wherein, $a_1$ is a constant.

Since the frequency of change in the gear ratio set in the transmission 4 is small, it is possible to obtain the information concerning the vehicle speed with sufficient accuracy for the calculation of the gear ratio even when using data from a slow-response vehicle speed sensor such as the vehicle speed sensor 7 of the construction described above.

Gear ratio data $D_k$ calculated by the ratio calculating unit 10 as described above and indicating the gear ratio k is applied to a gear position discriminating unit 13 in order to discriminate which gear position the transmission 4 is in at that time. That is, since the gear ratios selectable in the transmission 4 are known in advance, if data concerning these known gear ratios are stored in the gear position discriminating unit 13 in advance, the present gear position in the transmission 4 can be easily discriminated by comparing the gear ratio data $D_k$ with these stored data in sequence.

As a result, when the gear ratio k calculated in the ratio calculating unit 10 is not correct for some reason, it will not coincide with any of the stored data. Thus, it is possible to check as to whether or not any calculating error has arisen on the basis of the discriminated result in the gear position discriminating unit 13.

The gear ratio data $D_k$ is further applied to a movable contact $17_a$ of a switch 17 having two fixed contacts $17_b$ and $17_c$, and to a detecting circuit 18 for detecting whether or not the magnitude of the gear ratio data $D_k$ has changed by more than a predetermined value M. The detecting circuit 18 produces a control signal CS whose level is low when the magnitude of the gear ratio data $D_k$ is not changed by more than M, and the control signal CS is applied for controlling the switch 17.

The switch 17 is operated by the control signal CS in such a way that it is switched as shown by the solid line when the level of the control signal CS is low and switched as shown by the broken line when the level of the control signal CS is high.

The fixed contact $17_b$ is connected with a filter circuit 14 having a first order lag characteristic, wherein the gear ratio data $D_k$ is stabilized. After this, the stabilized ratio data $D_0$ is output from the filter circuit 14 and is applied to an output data calculating unit 15 to which the engine speed data N is input. On the other hand, the data $D_k$ derived from the fixed contact $17_c$ of the switch 17 is directly applied to the output data calculating unit 15 as data $D_0$. The output data calculating unit 15 is responsive to both data N and $D_0$ to calculate the vehicle speed v in accordance with the following formula:

$$v = a_2 \cdot \frac{N}{D_0} \quad (2)$$

Where $a_2$ is a constant.

Thus, output data $D_{out}$ indicating the vehicle speed v is output from the output data calculating unit 15.

An explanation will now be made regarding the operation for compensation for the response lag in the calculated value of the gear ratio, which is performed by the detecting circuit 18, the switch 17 and the filter circuit 14 having a first order lag characteristic.

The case where the gear change operation is carried out at time $t_1$ during acceleration of the vehicle 3 and the engine speed $N_e$ is lowered as shown in FIG. 2A will be described. Although the actual engine speed decreases when the gear change operation is carried out at time $t_1$, the actual vehicle speed $V_c$ increases at a predetermined rate even after time $t_1$ as shown in FIG. 2B. The value of gear ratio k calculated in the ratio calculating unit 10 is stepwisely changed from $k_1$ to $k_2$ at time $t_1$ (FIG. 2C). When the gear ratio k indicated by the gear ratio data $D_k$ has changed by more than the predetermined value M, that is, when the difference between $k_1$ and $k_2$ shown in FIG. 2C is more than M, the level of the control signal CS becomes high, so that the switch 17 is switched over as shown by the broken line in FIG. 1. Therefore, the content of the gear ratio data $D_k$ is applied as data $D_0$ to the output data calculating unit 15. Consequently, the value k' indicated by the data $D_0$ at this time is changed as shown by the solid line in FIG. 2D.

In contrast, when the gear ratio k indicated by the gear ratio data $D_k$ has not changed more than the predetermined value M, that is, when the difference between $k_1$ and $k_2$ shown in FIG. 2C is not more than M, the level of the control signal CS is low, so that the switch 17 is switched over as shown by the solid line in FIG. 1. Therefore, the gear ratio data $D_k$ is passed through the filter circuit 14 and stabilized ratio data $D_0$ is obtained from the filter circuit 14. In this case, the value k' indicated by the data $D_0$ is changed as shown by the broken line in FIG. 2D due to the first order lag characteristic of the filter circuit 14. Although the value of the gear ratio k is shown to be constant in FIG. 2C except for the case where $t=t_1$, as will be understood from the foregoing description, the value of k is not actually constant due to deviation. However, the deviation is removed by passing the data $D_k$ through the filter circuit 14. As a result, such deviation is not included in the value of k' obtained by passing the data $D_k$ through the filter circuit 14.

FIG. 2E shows the vehicle speed represented by output data $D_{out}$ obtained by the calculation based on stabilized ratio data $D_0$ and engine speed data N. The broken line curve in FIG. 2E corresponds to the case where the filter circuit 14 has a first order lag characteristic. In contrast, the solid line curve i FIG. 2E corresponds to the case where the data $D_k$ is obtained without the use of the filter circuit 14.

As will be understood from the foregoing description, since the filter circuit 14 having the first order lag characteristic is used only when the magnitude of change in the gear ratio is not more than the value M, it is possible to make the vehicle speed represented by data $D_{out}$ obtained by the calculation coincide with the actual vehicle speed.

With this construction, as described above, the gear ratio, for which a high response characteristic is not required, is calculated using the vehicle speed detected from the rotation of the speedometer cable 6 with reference to the engine speed data N, and the gear ratio data $D_k$ representing the gear ratio k obtained by the foregoing calculation is corrected and stabilized by the use of the filter circuit 14 only when the magnitude of change in the ratio k is not more than a predetermined value. Then on the basis of the gear ratio k' obtained from the output of the filter circuit 14 or the switch 17 and the engine speed, the vehicle speed can be calculated with high accuracy in accordance with the period of detection of the engine speed data N representing the engine speed.

When the rotation of the speedometer cable 6 is utilized for the calculation of the gear ratio as in this embodiment, since an adjustment is made on the vehicle side in such a way that a predetermined relationship is always maintained between the rotational speed of the speedometer cable 6 and the vehicle speed, it is possible to detect the vehicle speed with high accuracy without any adjustment regardless of the type of vehicle to which the apparatus of the present invention is applied.

In this embodiment, vehicle speed data required for calculating the gear ratio is obtained by the detection of the rotation of the speedometer cable. With this construction, it is not necessary to adjust the vehicle speed detecting sensor coupled with the speedometer cable depending on the type of vehicle. Consequently, the apparatus is advantageous in that it can be widely used in all types of vehicles and requires less time for installation in the vehicle.

The present invention is not limited to the arrangement of the embodiment described above; other arrangements in which, for example, the vehicle speed data is obtained from an appropriate rotating member other than the speedometer cable are also possible.

As the computing unit 20 shown in FIG. 1 there may be used a microcomputer in which a computing program for obtaining the vehicle speed in a similar way to that described above is executed.

Figure 3:
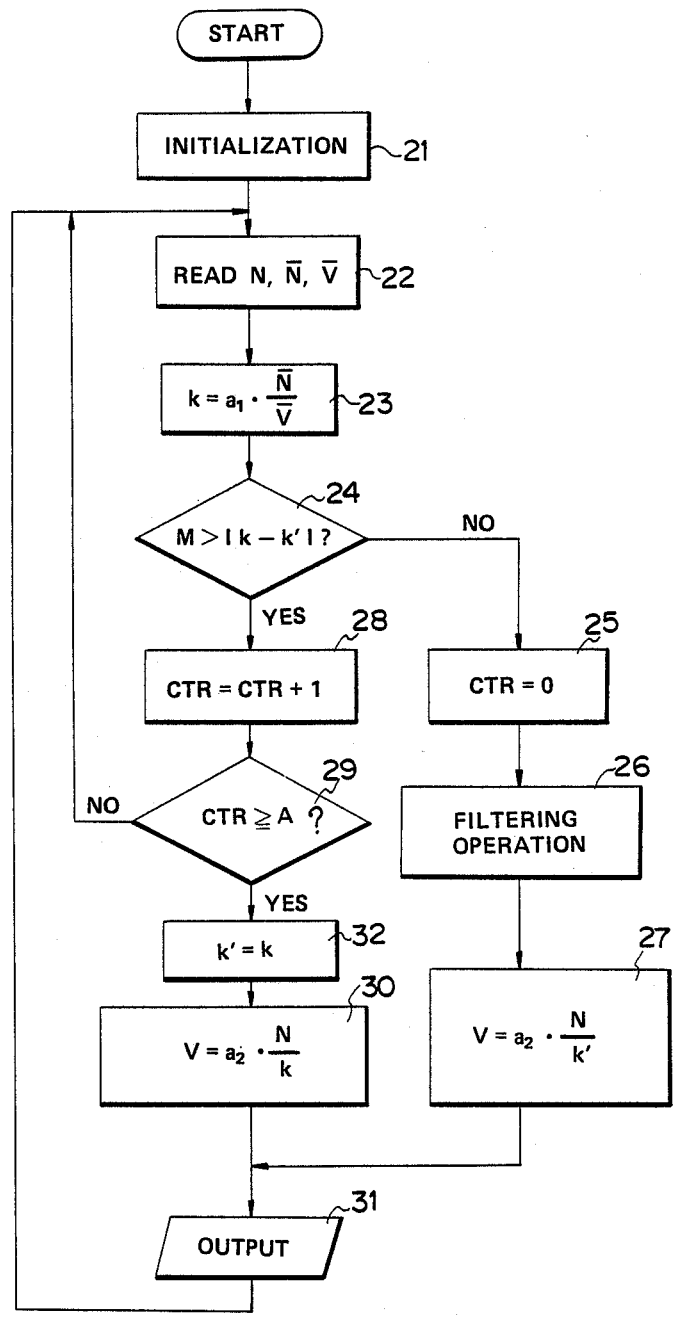
FIG. 3 is the flowchart of a computing program executed in a microcomputer when a microcomputer is used to carry out a calculation similar to that of the computing unit shown in FIG. 1.

FIG. 3 is a flow chart showing an example of such a computing program to be executed in a microcomputer by which a calculation approximately equivalent to the calculating function of the computing unit 20 is carried out.

After initialization in step 21, engine speed data N, average engine speed data $\overline{N}$ and average vehicle speed data $\overline{V}$ are read into the microcomputer in step 22 and the gear ratio k is calculated in response to the average engine speed data $\overline{N}$ and the average vehicle speed data $\overline{V}$ in step 23. In step 23, the calculation for k is performed in accordance with the formula (1). The program moves to step 24 in which to up-to-date value of k obtained in step 23 is compared with the value of k', which is the previous value obtained in step 26 or 32 in the last program cycle, and a discrimination is made as to whether the difference between the values of k and k' is more than a predetermined value M.

When the decision in step 24 is NO, that is, the difference between the values of k and k' is not more than the predetermined value M, the counter CTR is reset in step 25 so that the content of the counter CTR becomes zero and data $D_k$ indicating the value of k at that time is subjected to the filtering operation with a first order lag characteristic in step 26. The program moves to step 27 wherein the vehicle speed v is calculated on the basis of the gear ratio obtained in step 26 and the up-to-date engine speed data N in accordance with the formula (2). The result of the calculation in step 27 is output as vehicle speed data $D_{out}$ in step 31.

On the other hand, when the decision in step 24 is YES, the operation moves to step 28 wherein the content of counter CTR is increased by 1 and then a decision is made in step 29 as to whether the content of the counter CTR is equal to or more than a predetermined value A. When the contents of the counter CTR is less than A, the operation is returned to step 22. In contrast, when the decision in step 29 is YES, in step 32, the value of k' is replaced by the value of k which was obtained in the most recent calculation in step 23. Then, the operation moves to step 30 wherein the vehicle speed v is calculated on the basis of the value of the gear ratio k obtained in step 23 and the engine speed data N in accordance with the following formula:

$$v = a_2 \cdot \frac{N}{k} \quad (3)$$

Where $a_2$ is a constant.

Steps 28 and 29 are provided for the purpose of checking whether or not the YES condition in step 24 is continuously maintained for a predetermined time corresponding to A, and the calculation in step 30 is carried out only when the YES condition in step 24 is continuously maintained for a time corresponding to A. Therefore, when the result of the decision in step 24 changes from YES to NO before the count of the counter CTR reaches A, the calculation of the vehicle speed is carried out in step 27. As a result, when the result in step 24 becomes YES due to a noise component, for example, since the result in step 26 returns to NO before the contents of the counter CTR reach A, the execution of the gear change operation can be reliably detected.

As a result, it follows that the calculation of the vehicle speed is carried out in step 30 in accordance with the formula (3) when the gear ratio has just been changed by the operation of the transmission. When the value of the gear ratio k reaches some value and becomes stable, the calculation of the vehicle speed is carried out in step 27 in accordance with the formula (2). The result of the calculation in step 27 or 30 is output in step 31. Consequently, since the value of the gear ratio k is directly utilized for the calculation of the vehicle speed just after gear change operation, the calculation of the vehicle speed can be made more accurately than in the case where the ratio k' is used therefor.

What is claimed is:

1. An apparatus for calculating an instantaneous speed of a vehicle powered by an internal combustion engine whose rotational output is supplied through a transmission, which is set in a selectable gear ratio, to a wheel driving mechanism of said vehicle, said apparatus comprising:

a first means for producing a first signal indicating an instantaneous rotational speed of the internal combustion engine;

a second means for producing a second signal indicating an average running speed of the vehicle;

a third means for calculating a gear ratio set in the transmission in accordance with said first and second signals and for producing a third signal representing the calculated gear ratio; and a fourth means for calculating the instantaneous vehicle speed in accordance with said first and third signals and producing output data indicative of the calculated instantaneous vehicle speed.

2. An apparatus as claimed in claim 1 wherein said first means has a first sensor for generating a first pulse every time an output shaft of the internal combustion engine rotates by a predetermined angle and means responsive to said first pulses for determining the speed of the internal combustion engine on the basis of the period of said first pulses and producing a signal indicating the determined engine speed as said first signal.

3. An apparatus as claimed in claim 1 wherein said second means includes a second sensor which operates in response to the rotation of a speedometer cable provided on the output side of the transmission and produces a second pulse every time the speedometer cable rotates by a predetermined angle.

4. An apparatus as claimed in claim 3 wherein said second means has means responsive to said second pulses for determining the speed of the vehicle on the basis of the period of said second pulses and producing vehicle speed data indicating the determined vehicle speed, and means responsive to said vehicle speed data for calculating the average vehicle speed on the basis of a plurality of vehicle speed data received thereby and producing a signal indicating the calculated average vehicle speed as said second signal.

5. An apparatus as claimed in claim 1 wherein said third means has a computing means responsive to said first and second signals for producing a gear ratio signal, a filtering means for effecting a filtering operation on said gear ratio signal with first order lag characteristic, means responsive to the gear ratio signal for detecting whether or not the change in the gear ratio is more than a predetermined value, and means responsive to the output of said detecting means for selecting either said gear ratio signal or the output from said filtering means as said third signal.

6. An apparatus as claim in claim 5 wherein said computing means has means responsive to said first signal which calculates the average engine speed of the internal combustion engine and produces an average engine speed signal indicating the calculated average engine speed, and means responsive to said average engine speed signal and said second signal for calculating the ratio between the average engine speed and the average vehicle speed and producing said gear ratio signal in accordance with said gear ratio.

7. An apparatus as claimed in claim 5 wherein said selecting means operates in such a way that said gear ratio signal is selected when the change in the gear ratio is more than the predetermined value and the output from said filtering means is selected when the change in the gear ratio is not more than the predetermined value.

8. An apparatus as claimed in claim 7 wherein said selecting means selects said gear ratio signal only when the change in the speed change ratio continues to be more than the predetermined value for a predetermined period.

* * * * *